Figure 1:
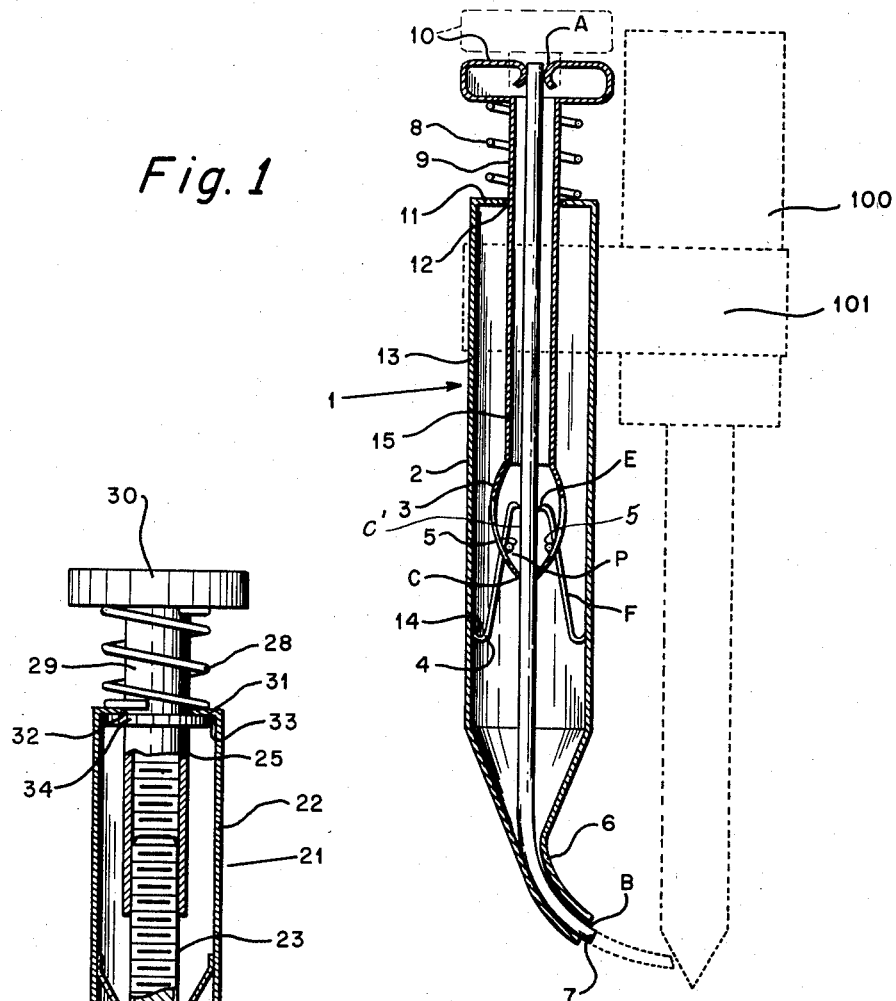

Aug. 26, 1958  A. N. SHAPIRO  2,848,969
SOLDER FEEDER
Filed Feb. 11, 1954

INVENTOR.
ALVIN N. SHAPIRO
BY
ATTORNEYS

United States Patent Office 2,848,969
Patented Aug. 26, 1958

2,848,969

SOLDER FEEDER

Alvin N. Shapiro, Philadelphia, Pa.

Application February 11, 1954, Serial No. 409,786

3 Claims. (Cl. 113—94)

(Granted under Title 35, U. S. Code (1952), sec. 266)

The invention described herein may be manufactured and used by or for the Government of the United States of America for governmental purposes without the payment of any royalties thereon or therefor.

The invention relates to a solder feeder and more particularly to an automatic solder feeder and bending mechanism by means of which application of solder and control of a soldering iron to provide automatic feeding of solder to a desired position may be accomplished simultaneously utilizing only one hand.

Previous methods of applying solder made the soldering operation awkward and required materials to be joined to be firmly clamped or to be pre-tinned. Pre-tinning required extra time and did not always bring the solder to the proper points. Clamping also required extra time plus the use of clamps. The soldering operation itself was inefficient, especially when used in electrical connections of wires and lugs, since total control of the operation was achieved only at the expense of time and material. The present invention overcomes these disadvantages and additionally frees the hand which previously controlled application of solder so that this hand may be now utilized for other duties, thus simplifying the soldering operation. The inventive device also overcomes disadvantages of the prior art of necessity of pre-tinning the materials to be joined or clamping them together. It is also less time consuming than prior art devices. The instant invention permits simultaneous performance of three operations by one person, i. e. the invention permits firm holding of the work with one hand controlling pliers or other tools or directly holding the work, while with the other hand application of both iron and solder can be controlled.

Accordingly, a purpose of the instant invention is to provide means whereby application of solder and control of the soldering iron can be accomplished simultaneously, utilizing only one hand.

Another purpose is to present a device which is economical to manufacture, easy to operate and which will automatically and simultaneously control a soldering iron and release of solder utilizing only one hand for the operation.

Another aim of the invention is to provide a solder dispenser whereby exact required amounts of solder material may be fed to the work and having means incorporated therein to provide for deforming of the solder to a position where the solder may be simultaneously heated and fed to the work.

Still another aim of the inventive device of this application is to provide means for saving materials by feeding an exact quantity of solder required for a particular job to the exact location where it is to be utilized and simultaneously permitting manipulation of the work which is to be soldered, thereby allowing a hot soldering operation, with no time lapse during which a cold solder joint could result.

Another object of the inventive device is to provide a finger operated control device for dispensing soldering or other material to a job upon which work is to be performed, the device being readily manipulated using only one hand and allowing the other hand of the workman free for cooperating operations in performing the particular job.

Still another aim of the invention is to provide an efficient, rapidly operated and economical device which will require relatively little repair and be of relatively inexpensive initial cost as well as greatly facilitating a soldering operation.

Figure 2:
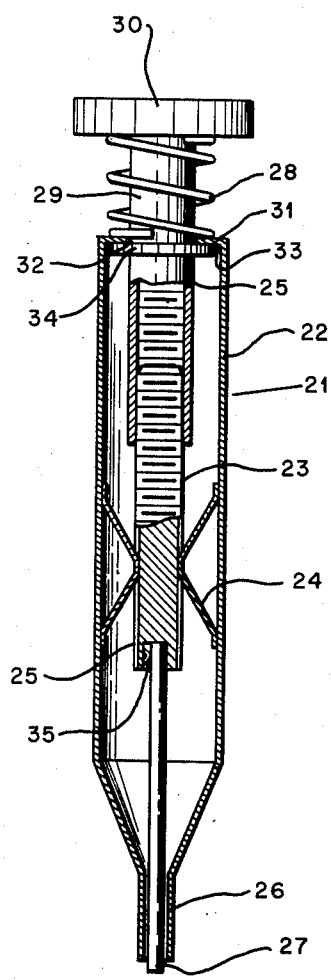
Figure 3:
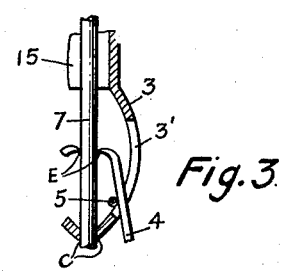

Other objects and many of the attendant advantages of this invention will be readily appreciated as the same becomes better understood by reference to the following detailed description when considered in connection with the accompanying drawings wherein:

Fig. 1 represents a cross-sectional view of one form of the solder feeder of the invention, Fig. 2 is a cross-sectional view of another form of the solder feeder of the invention, and Fig. 3 is a detail of the coacting elements within the device of Fig. 1.

Referring to Fig. 1 the solder feeder is generally denoted by the numeral 1. A hollow tubular member 2 has a narrow orifice 6 at its lower end and an upper face 11, the upper face containing aperture 12 disposed therethrough. Narrow orifice 6 may be curved if desired to facilitate tinning of and use with the soldering iron 100 (shown in phantom). Longitudinally disposed in the tubular member 2 and extending through the aperture 12 may be a second tube or apertured rod 9 of smaller cross-sectional diameter than tubular member 2 and which at its lower end terminates in a pair of slightly curved prongs 3. Curved prongs 3 are bent outwardly and then inwardly at angles of about 30° to form a bowed cross-sectional configuration for a purpose to be described. The 30° angle has proved satisfactory however this angle is not to be construed as critical and may be widely varied within the limits of operability. Attached internally to tubular member 2 at oppositely disposed points are generally straight prongs 4 with opposed hooked portions at their upper ends hereinafter referred to as "hooked prongs." The prongs may be so disposed that the uppermost portion of the hooked prongs 4 are always above the lowermost portion of curved prongs 3, by passing through a pair of slots 3', respectively, in prongs 3, as best shown in Fig. 3. A pair of pin members 5 are anchored to the curved prongs 3 and are disposed across their respective slots 3'. Prongs 4 are mounted in such a fashion that the hooked ends at E are normally biased into engagement with solder 7 except when restrained by pins 5.

A button member 10 which may have an aperture (not numbered) therethrough is attached to and superimposed on the upper end of smaller tube 9. Between button member 10 and face 11 of tubular member 2 may be disposed a coiled compression spring 8. Clamped to the solder feeder is a soldering iron 100 in a clamp 101 shown in phantom in Fig. 1. The device is shown with a length of solder 7 protruding therethrough. Hooked prongs 4 may be anchored to the inner walls of the tube at points 14. Hooked prongs 4 may each comprise a reversely bent spring member having an upper portion bent inwardly of tube 2 and downwardly of tube 2 at a solder engaging point and a lower bent portion, bent outwardly and upwardly at 14. As indicated by the phantom lines in Fig. 1, button member 10 is shown by solid line in a partially depressed position.

If desired the lower portion of each hooked prong 4 may be made straight and bent at the proper angle to permit it to be readily mechanically attached to the inner side walls of tube 2. The fastened portion may be curved to fit the inner curvature of tube 2 for greater strength of mechanical jointure.

In operation of the device illustrated in Fig. 1, solder 7 is inserted through the opening in button 10 at point A until solder 7 extends through the orifice of the narrowed portion 6 at point B. With button 10 shown in its position as illustrated partially depressed, solder 7 is gripped by hooked prongs 4 at point E and by prongs 3 at point C when button 10 is in the position illustrated in Fig. 1. With button 10 in its fully extended position as shown in phantom, pins 5 are raised with prongs 3 to thereby separate prongs 4 and not engage solder 7 at E. When it is desired to apply solder to the tip of soldering iron 100 the thumb of the operator is pressed down on button 10 when it is in its position shown in phantom. As button 10 is depressed, the tips of prongs 3 at C engaging solder 7 will pull the latter downwardly through opening 6 towards the tip of the iron as shown in phantom at the bottom of solder 7. When button 10 is depressed sufficiently to the point illustrated in solid lines in Fig. 1, pins 5 on prongs 3 reach level P whereby hooked prongs 4 are permitted under their normal biasing action to close in on solder 7 and engage the latter at E. However, due to the shape of the hooking at E, further depression of button 10 continues to feed solder 7 since the shape of hooked prongs 4 at E will permit easy downward passage of the solder. When thumb pressure is released from button 10 in a position below that illustrated in Fig. 1, button 10 under the influence of spring 8 is raised but solder 7 remains in its position because of the action of prongs 4 at E to retain solder 7 as prongs 3 slide upwardly under the influence of the spring 8. When it is desired to feed more solder further downward pressure on button 10 again moves solder 7 in the manner described above to slide past the hooked ends of prongs 4 at E. Thus, by repeated manipulation of button 10 the solder 7 is fed as desired or as needed. Release of button 10 to its position shown in phantom will retract solder 7 away from soldering iron 100 when not being used because of the spreading of prongs 4 at E.

Close control may be exerted over the application of the solder to the iron, by use of the thumb. The hooked prongs 4 and pins 5 automatically feed the solder 7 whenever enough solder is used up to require pushing the pins 5 past level P. The length of solder thus fed, will equal the distance between level P and the most downward point reached by the pins 5.

Fig. 2 shows a modified form of the device. In this modification, a hollow tube 22 having an upper end face 31 apertured at 32 and lower reduced orifice 26 which may be curved if desired similar to the device of Fig. 1, contains a tubular internally bored and threaded rod or relatively small tube 29. Externally threaded solder holder 23 contains chucking means 35 which may hold a length of solder 27. Oppositely disposed on the exterior surface of solder holder 23 is a pair of slots or grooves 25 which are disposed longitudinally along at least a portion of the longitudinal dimension of solder holder 23. These slots may extend the length of solder holder 23 if desired. Fastened to the interior surface of tubular member 22 is a pair of oppositely disposed inverted V-shaped members 24 the apex of the V being adapted to be slidingly received within slots 25. Slots 25 thereby form track members into which are fitted V-shaped members 24 so that solder holding member 23 may be nonrotatably positioned and still be free to move longitudinally upwardly and downwardly. A bias spring member 28 holds cap or button member 30 in spaced relation to the upper portion 31 of tubular member 22. A stop member 33 which may comprise an annular ring or a bushing limits upward travel or retraction of tube 29 beyond the desired point. Such a stop member may also be secured to the tube 9 in the embodiment illustrated in Fig. 1 to limit the upward travel of tube 9 in response to the biasing effect of the spring 8.

It is contemplated and within the scope of the invention that threaded rod 25 and button 30 may have aligned apertures therethrough to contain a longer length of solder extended through a suitable longitudinal opening through the solder holder 23 where time of replacement of solder is a significant factor as in relatively large production operations.

Operation of the device of this figure is as follows: A length of solder 27 may be inserted into the chuck holder 35 of solder holder 23. Button 30 is then rotated counterclockwise to permit solder holder 23 to advance downwardly, solder holder 23 sliding along V-shaped members 24 which prevent solder holding member 23 from rotating while at the same time allowing movement of solder holder 23 in the direction of its longitudinal axis in the track formed by its slots or grooves 25 by which members 24 are bearingly and slidably received. Solder 27 may be cut off at the correct length if desired or predetermined lengths of solder may be fed of a size suitable for this device. When the device is to be used, depressing button 30 against the bias of spring 28 will cause internally threaded member 29 which is fixedly secured to button 30 to move downwardly, this action being transmitted to solder holding member 23 which slides downwardly thereby pushing solder 27 further through the narrow orifice 26 of tubular member 24. The extended solder may then be applied to a soldering iron or other surface.

If desired the soldering iron and solder feeder may be clamped in angular relationship and the button plunger mechanism may be introduced for finger control from a side of the solder feeder with transmission of motion to the feeding means illustratively shown in Figs. 1 and 2. For example, a button member could be connected to a telescopic sleeve and the arrangement spring biased. The telescopic sleeve could transmit plunger motion of the button through music wire, beaded chain, spring steel ribbon or other means which in turn could impart a force to a spring means in the upper portion of the tube to actuate the solder feeding mechanism.

Thus, it is readily seen that means whereby application of solder and control of the soldering iron can be accomplished simultaneously while utilizing only one hand is provided, the means presenting a novel and improved method of applying solder in a particular spot where it is to be utilized and wherein economy and saving of material may be accomplished by a relatively inexpensive and highly useful device.

Obviously many modifications and variations of the present invention are possible in the light of the above teachings. It is therefore to be understood that within the scope of the appended claims the invention may be practiced otherwise than as specifically described.

What is claimed is:

1. A solder feeder comprising a first tubular member having a lower orifice and an upper face, said upper face having an aperture therethrough, a second tubular member extending through said aperture and terminating at one end within said first tubular member and having opposed bowed lower prong members attached at said end, a button member having an aperture therethrough disposed perpendicular to the longitudinal axis of said second tubular member and attached to the upper end thereof, the prong members being bowed outwardly with respect to the second tubular member and then inwardly to form an approximately elliptical cross-sectional shape with the ends remote from the second tubular member being disconnected, there being a varying space throughout the lengths of the respective tubular members at least sufficient to pass a length of solder therethrough, a pair of reversely bent prongs each having a lower bent portion attached to the inside side wall of the first tubular member and having an upwardly and inwardly bent portion curving downwardly, the uppermost portions of the reversely bent prongs always being above the lowermost portions of the bowed prongs, abutment means on and rigidly attached to the bowed prongs in perpendicular relation to the reversely bent prongs, depression of said button member causing the solder to be gripped by the bowed prongs and pushed through the orifice of the first tubular member, said abutment means serving to limit pressure of the reversely bent prongs on the solder except in the lowered position of the bowed prongs, angles of curvature of the prongs with respect to the solder surface being such that retraction of the button member and the bowed prongs in the lowered position causes gripping of the solder by the reversely bent prongs to a greater degree than the gripping of the bowed prongs.

2. A solder feeder comprising a tubular housing member having a lower orifice and an upper end face, said upper face having an aperture disposed therein, a hollow rod member disposed in said aperture, said rod member terminating in a pair of bowed prongs within said tubular housing member, said bowed prongs having a pair of substantially vertical elongated slots, an abutment member attached to and extending laterally of each prong on each slot, a pair of hooked prong members each comprising a reversely bent portion, a straight portion and a portion angularly bent with respect to said straight portion, the hooked prongs being of width to be receivable in the slots of the bowed prongs, the angularly bent portions of the hooked prongs being secured to the inner walls of the tubular member and substantially parallel thereto, the reversely bent sections extending from the unattached ends of the bent sections of the hooked prongs and being disposed above the abutment members of the bowed prongs, said reversely bent portions being spaced by a length of solder disposed longitudinally in the housing member, said bowed members being spaced at their lower ends by the length of solder, and means to depress and elevate the rod member and attached bowed prongs, the abutment members bearingly and adjustably spacing the hooked prongs to permit selective release of and engaging of the solder upon elevation and depression of the rod member, respectively the solder substantially protruding through the narrow orifice in operative position.

3. A solder feeder comprising a first hollow tubular member having a lower orifice and an upper closing face, said upper closing face having an aperture disposed therethrough, a second hollow tubular member extending through said aperture disposed concentric with the longitudinal axis of the said first tubular member and terminating at some point within said first tubular member, button means superimposed on and secured to said second hollow member, coil spring means disposed between a lower face of said button means and the upper face of said first tubular member to space normally said button means from said upper face of said first tubular member, an aperture disposed in said button means to permit a length of solder to be inserted therethrough and pass through said first and second tubular members and said orifice, slotted curved prong means extending from the bottom end of said second tubular member into gripping engagement with said solder when inserted, hooked prong means extending from the inner wall of said first tubular member through the respective slot of said slotted curved prong means into gripping engagement with said solder, the gripping ends of said hooked prong means being hooked to permit solder movement toward said orifice but prevent said solder from being moved away from said orifice, and means on said curved prong means extending across said slot for disengaging the hooked ends of said hooked prong means from said solder when said button member is between its fully retracted position and some partially depressed position, to insure feeding of said solder when said button means is moved from its said partially depressed position to a fully depressed position and prevent withdrawal of said solder when said button means is released from its fully depressed position to said partially depressed position.

References Cited in the file of this patent

UNITED STATES PATENTS

| | | |
|---|---|---|
| 1,047,612 | Brantigam | Dec. 17, 1912 |
| 1,268,844 | Holinger | June 11, 1918 |
| 1,515,894 | Taylor | Nov. 18, 1924 |
| 1,631,063 | Rognley | May 31, 1927 |
| 1,851,420 | Carson | Mar. 29, 1932 |
| 2,604,064 | Sefton | July 22, 1952 |

FOREIGN PATENTS

| | | |
|---|---|---|
| 927,193 | France | Oct. 22, 1943 |